United States Patent Office 3,367,704
Patented Feb. 6, 1968

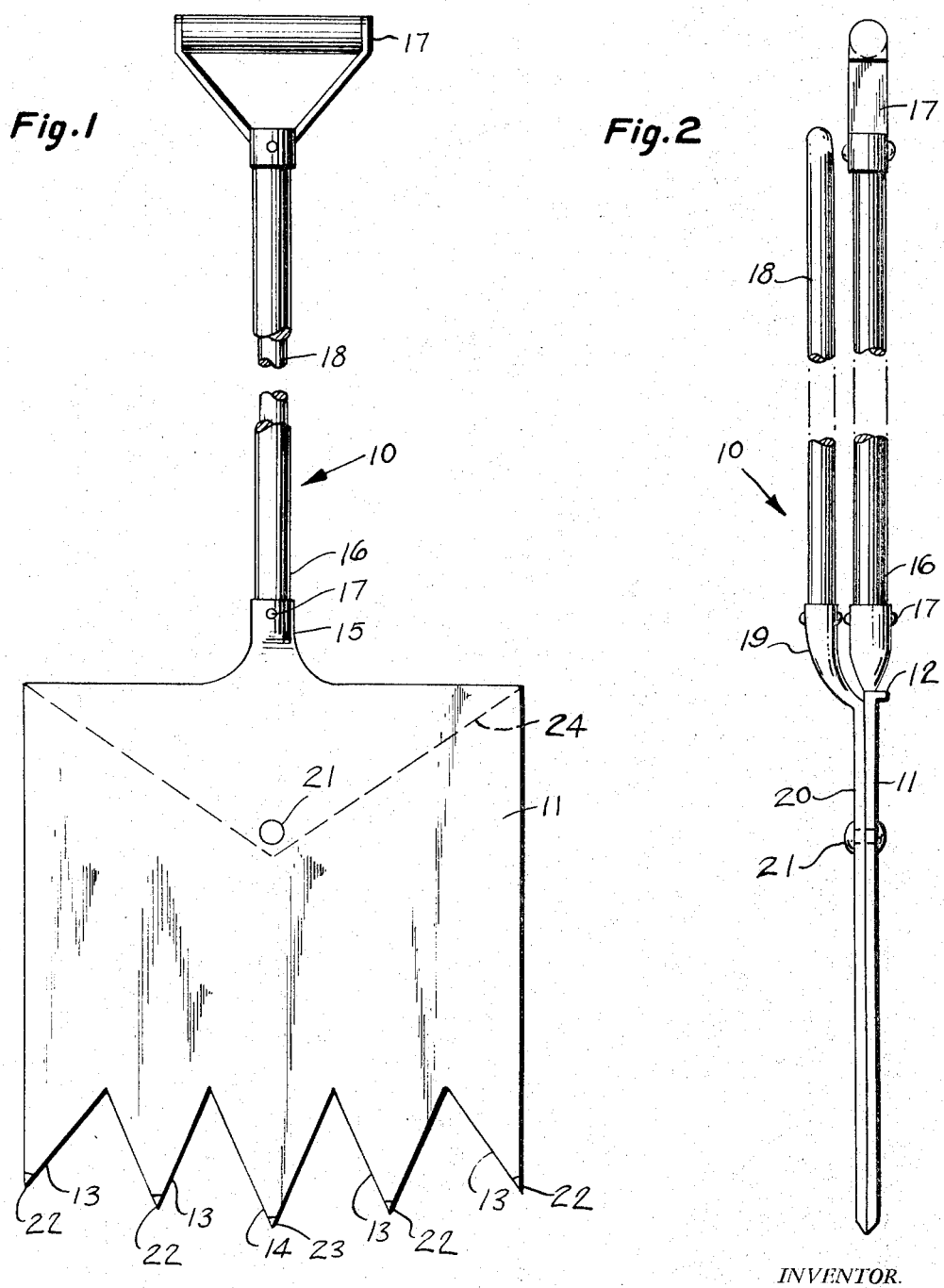

3,367,704
SHRUB SPADE
Frank M. Kleppin, 1462 S. 72nd St.,
West Allis, Wis. 53214
Filed Oct. 22, 1965, Ser. No. 500,884
4 Claims. (Cl. 294—58)

ABSTRACT OF THE DISCLOSURE

This invention embodies a main shrub spade structure the bottom or engaging portion of which is provided with a multiplicity of teeth with the longer tooth to the center to operate as a guide member when the structure is inserted in the ground. The blade member includes a socket for a handle, the axis of which is generally aligned with the blade member and terminates in a handle portion at the upper end. Attached to the blade member by a rivet is a second blade member which is seated upon the first blade member and is riveted thereto at its medial portion. The second blade member has teeth generally of the same structure and contour but slightly shorter than the first blade member and the upper end of this blade member is provided with an offset socket for the reception of a handle which generally overlies the handle of the first blade member so that the handles are positioned for control of the tool in the cutting of roots and the like and the transplanting of shrubbery. The upper marginal edge of the main blade member is provided at its top marginal edge with a foot cleat positioned on the blade assembly for inserting the same into the ground. By the provision of the second handle overlying the first handle, means are provided for manipulating the tool enabling an operator to use the strength of both hands in positioning, guiding and removing the tool when once inserted in the ground.

---

It is therefore the main purpose of this invention to provide a shrub spade for quick and efficient removal of shrubs and bushes.

Another object of this invention is to provide a shrub spade which includes an additional hand grip.

Another object of this invention is to provide a shrub spade having a center cutter for guiding the shrub spade into the ground.

A still further object of this invention is to provide a shrub spade which is easy to use and economical to manufacture.

Other objects and advantages of the invention will become apparent from a consideration of the following detailed description taken in connection with the accompanying drawing wherein a satisfactory embodiment of the invention is shown. However, it is to be understood that the invention is not limited to the details disclosed but includes all such variations and modifications as fall within the spirit of the invention and the scope of the appended claims.

In the drawing:

FIGURE 1 is a vertical view of this invention shown in elevated form.

FIGURE 2 is a side view of FIGURE 1.

According to this invention, a shrub spade 10 is provided with a blade member 11 having a foot cleat 12 positioned thereupon. The bottom portion of blade member 11 including a plurality of spade teeth 13, the center tooth 14 is longer than the remaining teeth 13, and is considered as a guiding tooth for the root cutting. A socket 15 for handle 16 is secured to the center portion of cleat 12 of the blade member 11. Upright handle 16 is secured within socket 15 by any desired conventional means such as rivets 17. The top portion of handle 16 is provided with a hand grasping device 17 which is fixedly secured to the handle 16. An elongated hand grip 18 is in parallel relationship with handle 16. The bottom portion of hand grip 18 is positioned within receptacle 19 having a curved configuration and being integrally connected with auxiliary blade member 20. As it can be seen from FIGURE 2 blade member 20 is in close proximity to blade member 11 and is connected thereto by a rivet 21. Like blade member 11, the auxiliary blade member 20 has identical dimensions in regard with the main blade member. However, the apex edges of blade member 20 are somewhat longer than the ones of blade member 11 as seen from FIGURE 1. As a result, teeth 13 and 14 shown in blade member 11 are designated as 22 and 23 of auxiliary blade member 20.

Looking now at FIGURES 1 and 2 of the drawing, one will see that auxiliary hand grip 18 provides an additional pushing or pulling capacity when the shrub spade is stuck in the ground.

It will also be noted that the combined action of central teeth 14 and 23 provide more effective control of the spade, especially when it is desired to cut the edges, although, blade members are welded to each other as indicated at 24.

By the structure shown a novel fast root cutting blade is provided with a pair of arms connected to each of the blades so that an operator can use the strength of both arms in manipulating the tool under a shrub or plant. The extended central tooth acts as a guide to maintain the tool aligned in its cutting action and the manipulation of the tool can be by use of either hand and arm of an operator or by use of both hands and arms simultaneously. Obviously the provision of the two handles with the cleat at the top of the bottom blade and the novel arrangement of cutting teeth provide for absolute control during removal or disposal of shrubs or bushes in gardens, nurseries and about homes. The use of the tool leaves no large holes, it being unnecessary to dig around the bush to find the roots, the spade being stuck into the ground like a shovel by foot pressure and positioned or pushed and pulled by either or both of the handles.

What I now claim is:

1. A shrub spade comprising a first blade member with a socket mounted medially of its upper edge, a handle secured within said socket with its axis generally aligned with said blade, the bottom portion of said member forming a plurality of tooth-like configurations, a second blade member having a receptacle positioned on the top of said member and offset forwardly of said socket, said member being of substantially identical configuration as said first member and overlying same and being fixedly attached thereto, and an elongated hand grip secured within said receptacle for handling of said shrub spade.

2. A shrub spade comprising a first blade member with a socket mounted thereon and a handle secured within said socket, the bottom portion of said member forming a plurality of tooth-like projections, a second blade member having a receptacle positioned thereon, said second member being of substantially identical configuration, including tooth-like projections as said first member and being fixedly attached thereto, the tooth-like projections of the second blade being slightly shorter in length than the tooth-like projections of the first blade, and an elongated hand grip fixedly secured within said receptacle and overlying said first handle for handling of said shrub spade, said receptacle being integrally and rigidly connected with said second member, said first blade member and said second blade member being riveted and welded to each other and a cleat at the top edge of the first handle.

3. A shrub spade comprising a handle, a first blade member with a socket mounted thereon, said handle being secured within said socket, the bottom portion of said first member forming tooth-like configuration, a second blade member having a receptacle positioned thereon, said second member being of substantially identical configuration as said first member and being fixedly attached thereto, an elongated hand grip secured within said receptacle for handling said shrub spade, said first blade member being integrally connected with said second blade member, said first member and said second member being riveted and welded to each other, and said tooth-like configurations of said first and second blade members being of different dimensions.

4. A shrub spade comprising a handle, a first blade member with a socket mounted thereon, said handle being secured within said socket, the other end of said handle having a hand grasping device attached thereto, the bottom portion of said first member forming tooth-like configurations, a second blade member having a receptacle positioned thereon, said second blade member being of substantially identical configuration as said first blade member and being fixedly attached thereto, an elongated hand grip secured within said receptacle for handling said shrub spade, said first blade member being integrally connected with said second blade member, said first blade member and said second blade member being riveted and welded to each other, said tooth-like configurations on said blade members being of different sizes in that the centrally positioned tooth-like configuration is larger than the remaining configurations for permitting central guidance of said shrub spade.

References Cited

UNITED STATES PATENTS

| | | | |
|---|---|---|---|
| 802,308 | 10/1905 | Olson | 294—49 |
| 826,928 | 7/1906 | Fleck | 294—58 |
| 1,263,949 | 4/1918 | Singer | 294—49 |
| 3,138,365 | 6/1964 | Rundle | 254—132 |

FOREIGN PATENTS 11,385   12/1902   Norway.

HUGO O. SCHULZ, *Primary Examiner.*